(12) United States Patent
Milosevski et al.

(10) Patent No.: US 9,578,161 B2
(45) Date of Patent: Feb. 21, 2017

(54) METHOD FOR METADATA-BASED COLLABORATIVE VOICE PROCESSING FOR VOICE COMMUNICATION

(71) Applicant: NXP B.V., Eindhoven (NL)

(72) Inventors: Vlatko Milosevski, Eindhoven (NL); Edwin Zuidema, Eindhoven (NL); Ralf Franciscus Magdalena Funken, Waalre (NL); Benoit Brieussel, Vitry sur Seine (FR); Wouter Joos Tirry, Wijgmaal (BE); Rob Goyens, Meeuwen-Gruitrode (BE)

(73) Assignee: NXP B.V., Eindhoven (NL)

( * ) Notice: Subject to any disclaimer, the term of this patent is extended or adjusted under 35 U.S.C. 154(b) by 155 days.

(21) Appl. No.: 14/106,614

(22) Filed: Dec. 13, 2013

(65) Prior Publication Data

US 2015/0172454 A1 Jun. 18, 2015

(51) Int. Cl.
*H04M 3/00* (2006.01)
*H04M 9/08* (2006.01)
*H04M 3/18* (2006.01)
*H04M 3/22* (2006.01)
*H04M 7/00* (2006.01)
*H04W 4/02* (2009.01)

(52) U.S. Cl.
CPC ............ *H04M 3/002* (2013.01); *H04M 3/18* (2013.01); *H04M 3/2236* (2013.01); *H04M 7/0063* (2013.01); *H04M 9/082* (2013.01); *H04W 4/027* (2013.01)

(58) Field of Classification Search
CPC ... H04W 8/245; H04W 8/265; H04M 1/72525
USPC .......................................................... 455/419
See application file for complete search history.

(56) References Cited

U.S. PATENT DOCUMENTS

| 7,181,027 | B1 * | 2/2007 | Shaffer ................. H04M 9/082 375/346 |
| 8,965,005 | B1 * | 2/2015 | Gopalakrishnan et al. . 381/94.1 |
| 2004/0208326 | A1 * | 10/2004 | Behrens ................. H04R 25/70 381/92 |
| 2005/0013443 | A1 * | 1/2005 | Marumoto et al. ............. 381/56 |
| 2007/0299622 | A1 * | 12/2007 | Smith et al. .................... 702/90 |
| 2008/0002839 | A1 * | 1/2008 | Eng ......................... G11B 27/10 381/103 |
| 2009/0080667 | A1 * | 3/2009 | Wollmershauser .. G10K 11/178 381/57 |

(Continued)

FOREIGN PATENT DOCUMENTS

| CN | 101719996 A | * | 6/2010 |
| CN | 102572369 A |   | 7/2012 |

(Continued)

OTHER PUBLICATIONS

Extended European Search Report for EP Patent Appln. No. 14183102.4 (May 8, 2015).

*Primary Examiner* — Qun Shen
(74) *Attorney, Agent, or Firm* — Rajeev Madnawat

(57) ABSTRACT

The use of a data link between two or more smart devices for voice communication allows for the enhancement of voice quality in a collaborative way through the exchange of well-defined meta-data between the smart devices. The meta-data may be exchanged on a separate IP data link or as part of the exchanged voice data packets.

15 Claims, 5 Drawing Sheets

(56) References Cited

U.S. PATENT DOCUMENTS

| | | | | |
|---|---|---|---|---|
| 2009/0225980 A1* | 9/2009 | Schmidt | ............... | H04M 9/082 |
| | | | | 379/406.02 |
| 2010/0121413 A1* | 5/2010 | Willerton | ............ | A61N 1/3706 |
| | | | | 607/60 |
| 2010/0184417 A1* | 7/2010 | Whittington | ............ | G10L 15/26 |
| | | | | 455/415 |
| 2011/0126119 A1* | 5/2011 | Young et al. | ................ | 715/744 |
| 2011/0300806 A1* | 12/2011 | Lindahl | ............... | G10L 21/0208 |
| | | | | 455/63.1 |
| 2013/0100970 A1* | 4/2013 | Vafin | ............... | H04N 21/44004 |
| | | | | 370/517 |
| 2014/0266669 A1* | 9/2014 | Fadell | ................. | G05B 19/042 |
| | | | | 340/501 |
| 2015/0121347 A1* | 4/2015 | Petit et al. | .................... | 717/126 |

FOREIGN PATENT DOCUMENTS

| | | |
|---|---|---|
| EP | 2 048 659 A1 | 10/2007 |
| WO | 2010/148777 A1 | 12/2010 |

\* cited by examiner

| ACTION REQUEST DESCRIPTION | ACTION REQUEST MESSAGE BYTE | CONTROL/SETTINGS MESSAGE BYTES | COMMENT |
|---|---|---|---|
| REMOTE ACTIVATION OF BACKGROUND NOISE SUPPRESSION | 0001 0001 | N.A. | PARTICIPANT A SENDS MESSAGE TO PARTICIPANT B TO ACTIVATE "B"s BACKGROUND NOISE SUPPRESSION |
| REMOTE DEACTIVATION OF BACKGROUND NOISE SUPPRESSION | 0001 0000 | N.A. | PARTICIPANT A SENDS MESSAGE TO PARTICIPANT B TO DEACTIVATE "B"s BACKGROUND NOISE SUPPRESSION |
| REMOTE SETTING OF THE BACKGROUND NOISE SUPPRESSION LEVEL | 0010 0000 | 0000 0001 OR 0000 0000 | CONTROL BYTE 0x1 MEANS INCREASE AND CONTROL BYTE 0x00 MEANS DECREASE THE BACKGROUND NOISE SUPPRESSION BY ONE LEVEL |
| REMOTE SETTING OF THE ACOUSTIC ECHO CANCELLATION LEVEL | 0011 0000 | 0000 0001 OR 0000 0000 | CONTROL BYTE 0x1 MEANS INCREASE AND CONTROL BYTE 0x00 MEANS DECREASE OF THE ACOUSTIC ECHO CANCELLATION BY ONE LEVEL |
| REMOTE SETTING OF THE PARAMETRIC EQ IN THE RECEIVING SIGNAL | 0100 0000 | ONE BYTE FOR EACH EQ BAND | THE GAIN OF THE EACH SUPPORTED EQ BAND WILL BE SET TO THE VALUE SPECIFIED IN THE COORESPONDING CONTROL/SETTINGS MESSAGE BYTE |
| INFORMING THE REMOTE PARTICIPANT ON LOCAL BACKGROUND NOISE SUPPRESSION | 0100 0001 | 0000 0001 OR 0000 0000 | BACKGROUND NOISE SUPPRESSION ON THE SIGNAL APPLIED IF THE CONTROL BYTE IS 0x1 OR NOT APPLIED IF THE CONTROL BYTE IS 0x00 |
| INFORMING THE REMOTE CALL PARTICIPANT ON THE APPLIED LOCAL COMPRESSION | 0100 0010 | BYTE INDICATING THE COMPRESSION LEVEL APPLIED | PARTICIPANT B KNOWS WHAT SIGNAL COMPRESSION LEVEL HAS BEEN APPLIED BY PARTICIPANT A, SO THAT SIGNAL CLIPPING IS AVOIDED ON THE PARTICIPANT B's SIDE |
| INFORMING THE REMOTE CALL PARTICIPANT ON LOCAL GPS LOCATION | 0101 0001 OR 0101 0010 | LONGITUDE BYTE OR LATITUDE BYTE | THE PARTICIPANT B GETS THE LONGITUDE/LATITUDE INFORMATION FROM PARTICIPANT A |
| INFORMING THE REMOTE CALL PARTICIPANT ON THE ACCELEROMETER DATA | 0101 0100 | THREE BYTES WHERE EACH BYTE CONTAINS THE ACCELEROMETER READINGS FOR EACH AXIS (X, Y, Z) | THE PARTICIPANT B GETS INFORMATION ON THE MOTION OF PARTICIPANT A |
| CONFIRMATION MESSAGE | 1111 1111 | N.A. | MESSAGE/COMMAND RECEIVED AND EXECUTION ACCEPTED |
| DECLINE MESSAGE | 1111 0000 | N.A. | MESSAGE/COMMAND RECEIVED BUT EXECUTION DECLINED |

FIG. 6

METHOD FOR METADATA-BASED COLLABORATIVE VOICE PROCESSING FOR VOICE COMMUNICATION

BACKGROUND

Recent developments in the area of smart devices (for example: smartphones, tablets and smart TVs) allow for the deployment of new use cases for the application of smart devices.

In particular, the deployment of so called 4G networks with increased data speed as well as the adoption of various Voice over Internet Protocol (VoiP) applications such as, for example, SKYPE or Facebook Messenger, indicates a trend that voice communication is moving from the traditional Cellular Networks such as GSM to Voice over Long Term Evolution (LTE) or VoiP networks. Unlike the traditional fixed line or cellular network voice calls where the exchange of the non-voice signal information is either non-existent or extremely limited, VoiP calls are based on the exchange of Internet Protocol (IP) data packets between call participants.

The emerging voice communications standards such as, for example, WebRTC, are capable of enabling peer-to-peer voice calls using a web page or browser or any type of HTML 5 browser application.

Background noise suppression is a feature on many smartphones that typically needs to be turned ON/OFF via a "Call Setting" device menu prior to making a voice call. The typical factory setting is OFF. The Background noise suppression feature can be tuned from mild background noise suppression to strong background noise suppression. However, the background noise suppression feature may also affect the quality of the transmitted voice signal. Strong background noise suppression may attenuate and/or distort the voice signal.

SUMMARY

The use of a data link between two or more smart devices for voice communication allows for the enhancement of voice quality in a collaborative way through the exchange of well-defined meta-data information between the devices.

BRIEF DESCRIPTION OF THE DRAWINGS

FIG. 6 shows exemplary embodiments of the metadata object in accordance with the invention.

DETAILED DESCRIPTION

Figure 1:
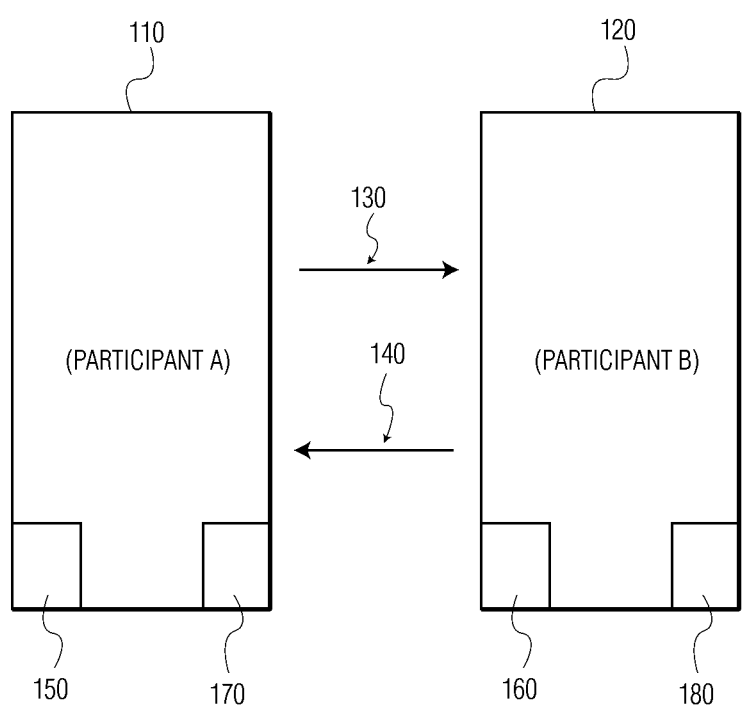
FIG. 1 shows a system in accordance with the invention.

In accordance with the invention, a number of categories of metadata can be exchanged between VoiP/VoLTE call participant smart devices such as a smartphone. The exchange of information is conducted by passing metadata bytes in the form of metadata objects that may be encapsulated in the VoiP data packets or exchanged between the smart devices of the call participants using a separate IP connection. FIG. 1 shows the exchange of metadata objects 130 and 140 between smart device 110 of call Participant A and smart device 120 of call Participant B during a VoiP/VoLTE call.

Figure 2:
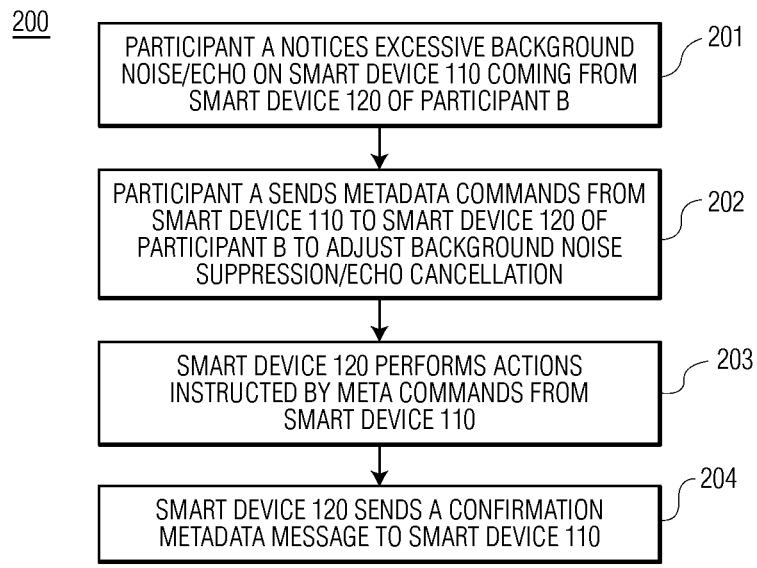
FIG. 2 shows an embodiment in accordance with the invention.

Exemplary embodiment 200 in accordance with the invention shown in FIG. 2 involves remote activation and/or adjustment of the other call participant's background noise suppression and/or acoustic echo cancellation processing. This allows, for example, Participant A to interactively activate and adjust these features as their effect is not typically discernable to Participant B. Additionally, background noise suppression may introduce unwanted artifacts like voice attenuation of deformation, especially when it is applied more than once. If Participant A has, for example, already performed background noise suppression on smart device 110, smart device 120 can automatically disable its background noise suppression function to preserve voice quality.

As shown in FIG. 2, during a VoiP/VoLTE call, in step 201, Participant A notices that there is excessive background noise coming from Participant B's side of the call and/or that there is a significant echo of Participant A coming from Participant B's side of the call. In accordance with the invention, Participant A sends appropriate metadata object 130 from smart device 110 to smart device 120 of Participant B. In this exemplary embodiment, metadata object 130 contains metadata commands from smart device 110 to smart device 120 of Participant B to remotely turn on and adjust the background noise suppression and/or the acoustic echo cancellation processing in smart device 120 of Participant B in step 202. The metadata commands are sent to the smart device 120 of Participant B and upon receipt of the metadata commands, smart device 120 of Participant B performs the actions instructed by the metadata commands in step 203 and sends metadata object 140, containing a confirmation metadata message, to smart device 110 of Participant A to indicate that the metadata commands have been executed in step 204. Steps 202 through 204 may be repeated to achieve voice quality acceptable to Participant A and Participant B may similarly send metadata commands from smart device 120 to adjust the background noise suppression and/or the acoustic echo cancellation processing in smart device 110 of Participant A.

Figure 3:
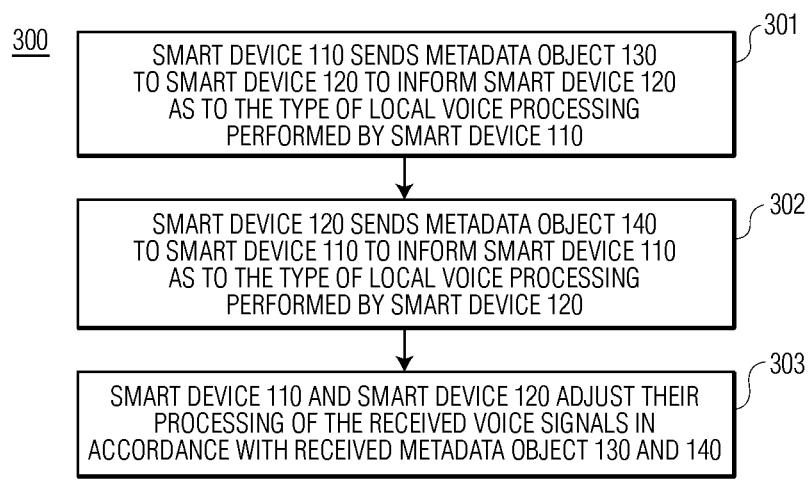
FIG. 3 shows an embodiment in accordance with the invention.

Exemplary embodiment 300 in accordance with the invention is shown in FIG. 3 and involves the exchange of local voice processing information between smart device 110 of Participant A and smart device 120 of Participant B. At the beginning of VoiP/VoLTE call in step 301, smart device 110 of Participant A sends metadata object 130 to smart device 120 of Participant B (see also FIG. 1) to inform smart device 120 as to what type of local voice processing is performed by smart device 110 to avoid double processing or to optimize local voice processing by smart device 120. Similarly in step 302, smart device 120 informs smart device 110 via metadata object 140 as to what type of local voice processing is performed by smart device 120. In step 303, smart device 110 of Participant A and smart device 120 of Participant B each adjust their processing of received voice signals in accordance with received metadata object 140 and metadata object 130, respectively.

For example, if smart device 110 of Participant A performs background noise suppression prior to the voice signal being sent to smart device 120 of Participant B, smart device 120 does not need to perform background noise suppression on the incoming voice signal because it is not needed. This saves battery power on smart device 120 of Participant B and typically provides better voice quality to Participant B as well, as the double application of background noise suppression may result in significant voice signal attenuation or distortion. Without the exchange of metadata object 130 and metadata object 140 containing voice processing data, local voice processing in smart device 110 and smart device 120 is unaware of what local voice processing has been applied to the received voice signal prior to transmission of the voice signal to the smart device. In the prior art, smart device 110 and smart device 120 typically apply generic pre-set local voice processing to the received voice signal. This may result in signal saturation if local voice processing has already been applied to the voice signal prior to transmission. Background noise suppression typically introduces unwanted effects, especially when it is applied more than once. In accordance with the invention, if Participant A has, for example, already performed background noise suppression on smart device 110, smart device 120 can automatically disable its background noise suppression function to preserve voice quality. Furthermore, the elimination of unnecessary voice signal processing reduces voice signal delay or latency which may be needed to meet a network operator's maximal signal delay specifications.

Figure 4:
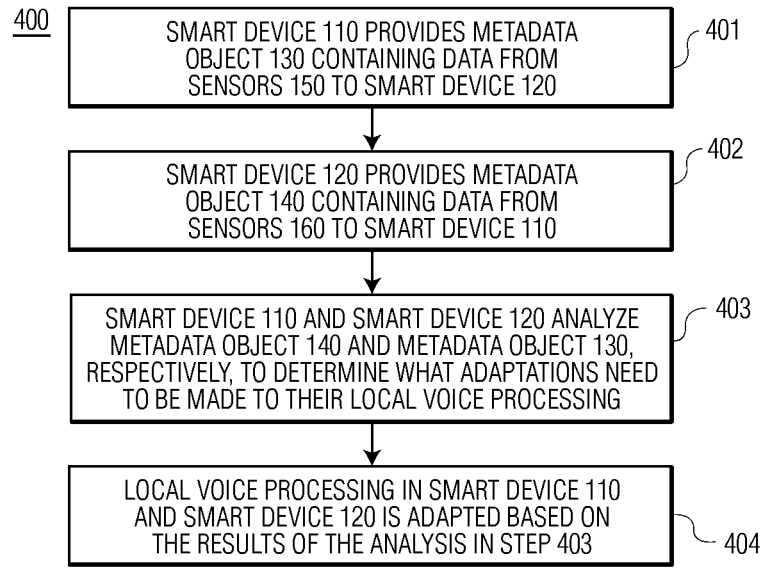
FIG. 4 shows an embodiment in accordance with the invention.

Exemplary embodiment 400 in accordance with the invention as shown in FIG. 4 involves the periodic transmission during a VoiP/VoLTE call of metadata object 130 and metadata object 140 that contains information from sensors 150 of smart device 110 and sensors 160 of smart device 160 (see FIG. 1). GPS coordinates, device sensor data and the like are periodically included in metadata object 130 and metadata object 140 communicated between smart devices 110 and 120 during the VoiP/VoLTE call. Having metadata object 130 and 140 include GPS coordinates and device sensor data provides information regarding the environment of Participant A and Participant B and allows adapting local voice processing by smart device 110 and smart device 120 to dynamically accommodate the environment of the other participant. Instead of applying a generic background noise suppression scheme, a dedicated background noise suppression scheme may be applied for the dominant background noise environment of the other participant. The background noise environment of the other participant may be dominated by car engine noise, wind noise, traffic noise, music etc.

In step 401 of FIG. 4, smart device 110 of Participant A provides metadata object 130 containing data from sensors 150 (e.g. GPS, accelerometer, compass) to smart device 120 of Participant B. In step 402, smart device 120 of Participant B provides metadata object 140 containing data from sensors 160 to smart device 110 of Participant A. In step 403, smart device 110 and smart device 120 analyze metadata object 140 and metadata object 130, respectively, to determine what, if any, adaptations need to be made to their local voice processing to accommodate the noise environment of Participant B and Participant A, respectively. In step 404, local voice processing in smart device 110 and smart device 120 is adapted based on the results of the analysis of step 403.

For example, upon receipt of metadata object 140 by smart device 110 from smart device 120 containing GPS coordinates and device sensor data related to Participant B indicating that Participant B is on a street and standing or walking, smart device 110 of Participant A is able to adapt background noise suppression of smart device 120 to reduce traffic background noise coming from Participant B. Similarly, if the GPS data indicates that smart device 120 of Participant B is moving relatively quickly, the local background noise suppression of smart device 120 of Participant B can be adapted to reduce car noise coming from Participant B. Note that the background noise suppression effect performed by smart device 120 is typically not audible to Participant B (and the background noise suppression effect performed by smart device 110 is typically not audible to Participant A).

Figure 5:
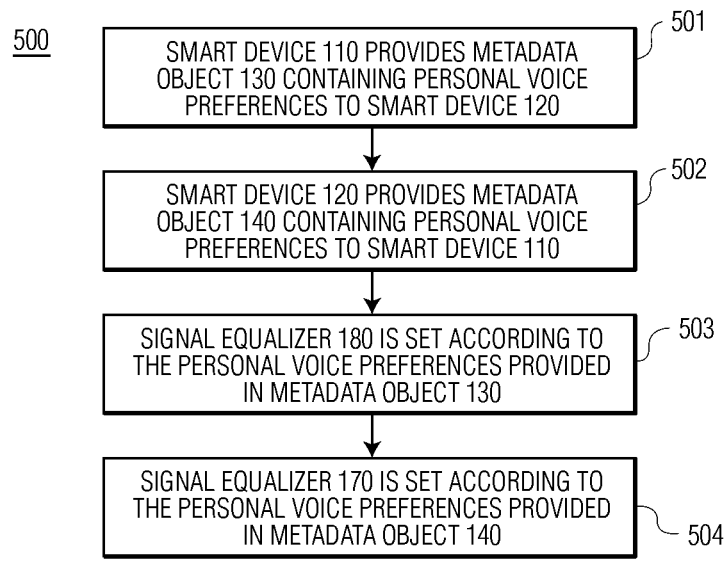
FIG. 5 shows an embodiment in accordance with the invention.
Figure 7:
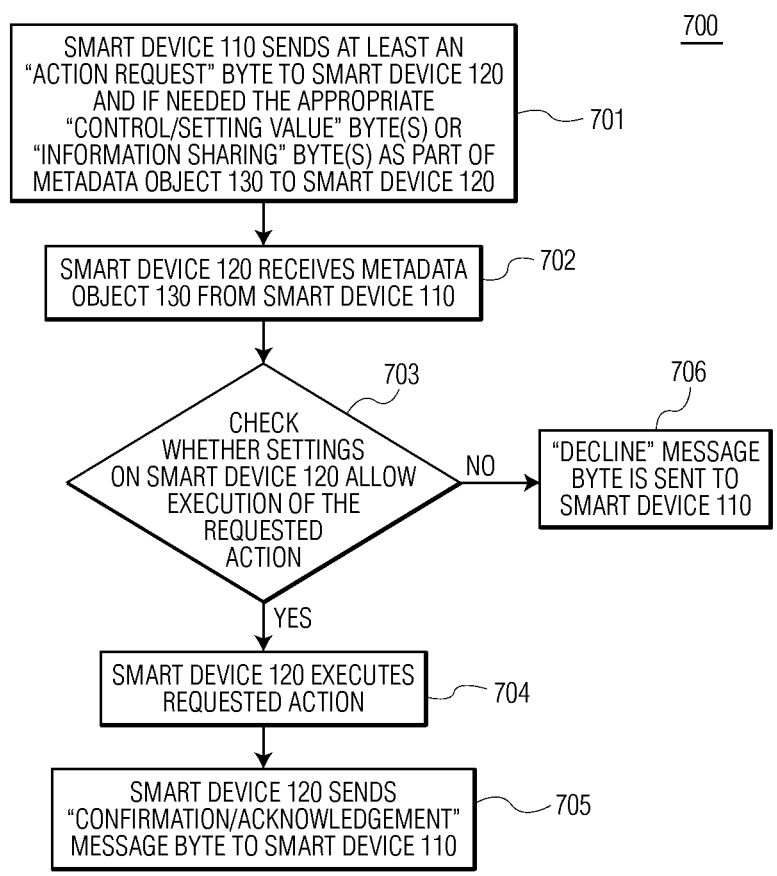
FIG. 7 shows an embodiment in accordance with the invention.

Exemplary embodiment 500 in accordance with the invention as shown in FIG. 5 involves Participant A and B on VoiP/VoLTE call setting personal voice preferences. Participant A and Participant B may prefer their personal voice setting that is typically implemented using signal equalizer 170 and signal equalizer 180 in the voice processing software of smart device 110 and smart device 120, respectively. At the beginning of the VoiP/VoLTE call, Participant A and Participant B exchange via metadata object 130 and metadata object 140, respectively, each other's signal equalizer preference. The signal equalizer preferences are then applied locally by signal equalizers 170 and 180 so that the remote voice reproduction is performed according to the personal voice preferences of Participant A and B. Each participant's voice is different, so both Participant A and Participant B may each choose their preferred signal equalizer setting. By setting different equalizer band gains, a participant's voice may be tuned to the participant's personal preference, for example, "smooth" (balanced gain across all frequency bands), "warm" (more low frequencies), "sharp" (more mid and high range frequencies), "soft" (attenuated gain across all frequency bands), "loud" (enhanced gain across all frequency bands) etc. Each signal equalizer setting has its advantages and disadvantages. For example, a "sharp" signal equalizer setting which boosts the high frequency bands typically improves voice intelligibility but may be annoying to Participant B if Participant A's voice is already naturally inclined towards higher frequencies.

In step 501 in FIG. 5, smart device 110 of Participant A provides metadata object 130 containing personal voice preferences to smart device 120 of Participant B. In step 502, smart device 120 of Participant B provides metadata object 140 containing personal voice preferences to smart device 110 of Participant A. In step 503, signal equalizer (EQ) 180 of Participant B is set according to the personal voice preferences provided in metadata object 130. In step 504, signal equalizer (EQ) 170 of Participant A is set according to the voice preferences provided in metadata object 140.

In an embodiment in accordance with the invention, metadata object 130 and metadata object 140 each are a sequence of bytes (octets of 0s and 1s). Each metadata object 120 and 130 typically includes the following messages. An "Action Request" message typically one byte in length with a unique binary value indicates a requested action from Participant A or Participant B to Participant B or A, respectively. A "Control/Setting Value" message containing a sequence of one or more bytes provides the information for the requested voice processing settings by Participant A or Participant B. An "Information Sharing" message containing a sequence of one or more bytes provides information that Participant A wishes to share with Participant B and vice versa. A "Confirmation/Acknowledgement" message typically one byte in length that the receiving participant (e.g. Participant B) answers back to the requesting participant (e.g. Participant A) that the information has been received and executed. A "Decline" message typically one byte in length that the receiving participant (e.g. Participant B) answers back to the requesting call participant (e.g. Participant A) that the information has been received but the requested operation has not been executed due to the local permission setting (e.g. on smart device 120). This allows Participants A and B to allow or deny execution of certain actions on their respective smart devices 110 and 120.

FIG. 6 showing table 600 describes the format of metadata object 130 and metadata object 140 in an embodiment in accordance with the invention Action Request Description column 601 of table 600 recites typical "Action Requests" in accordance with the invention and corresponding entries in Action Request Message Byte column 601 provide an exemplary message byte syntax for the respective "Action Requests". Control/Settings Message Bytes column 603 lists the "Control/Setting Value" syntax corresponding to the respective "Action Requests" in column 601, if applicable. Note that some "Action Requests" have no corresponding "Control Setting Value". Finally, Comment column 604 in table 600 describes the entries in column 603 and/or column 601.

In an embodiment in accordance with the invention, the metadata information exchange protocol 700 functions as follows. In step 701, smart device 110 of Participant A sends at least an "Action Request" byte to smart device 120 of Participant B and if needed the appropriate "Control/Setting Value" byte(s) or "Information Sharing" byte(s) as part of metadata object 130 to smart device 120 of Participant B. In step 702, smart device 120 of Participant B receives metadata object 130 from smart device 110 and in step 703, smart device 120 checks whether settings on smart device 120 allow or deny execution of the requested action. If Participant B's settings on smart device 120 allow execution of the requested action, step 704 is performed and the action is executed on smart device 120 and in step 705, a "Confirmation/Acknowledgement" message byte is sent to smart device 110 of Participant A. If Participant B's settings on smart device 120 do not allow execution of the requested action, step 706 is performed and a "Decline" message byte is sent from smart device 120 to smart device 110 of Participant A.

While the invention has been described in conjunction with specific embodiments, it is evident to those skilled in the art that many alternatives, modifications, and variations will be apparent in light of the foregoing description. Accordingly, the invention is intended to embrace all other such alternatives, modifications, and variations that fall within the spirit and scope of the appended claims.

The invention claimed is:

1. A method for metadata-based collaborative voice processing for voice communication comprising:
   detecting, by a first smart device, background and/or echo noise on the first smart device coming from a second smart device;
   sending, by the first smart device, metadata commands from the first smart device to the second smart device to effect adjustment of the background noise and/or echo cancellation function of the second smart device, wherein the first smart device remotely activates noise suppression or echo cancellation adjustment of the second smart device;
   performing, by the second smart device, noise suppression or echo cancellation adjustment based on the metadata commands received; and
   receiving a confirmation metadata message on the first smart device from the second smart device that indicates the adjustment has been performed.

2. A method for metadata-based collaborative voice processing for voice communication comprising;
   receiving, on a first smart device, a first metadata object sent from a second smart device, wherein the first metadata object comprises sensor data from the second smart device;
   analyzing the sensor data in the first smart device to determine what adaptations need to be made to local voice processing performed in the second smart device; and
   adjusting processing of voice signals received by the first smart device from the second smart device based on the first metadata object, wherein the first smart device remotely activates noise suppression or echo cancellation adjustment of the second smart device.

3. The method of claim 2, wherein the first metadata object comprises data related to local voice processing types performed by the second smart device.

4. The method of claim 2, further comprising:
   sending a second metadata object from the first smart device to the second smart device comprising the adaptations that need to be made to the local voice processing performed in the second smart device.

5. The method of claim 2, wherein the sensor data comprises GPS and accelerometer data.

6. The method of claim 2, wherein the first metadata object comprises personal voice preferences of a user of the second smart device and further comprises:
   setting a signal equalizer in the first device according to the personal voice preferences of the user of the second smart device.

7. The method of claim 2, wherein the first metadata object comprises a byte requesting an action.

8. The method of claim 7, wherein the first metadata object further comprises at least one of a group consisting of a byte indicating a setting, a byte indicating a level or a byte providing sensor data.

9. The method of claim 8, wherein a byte indicating a setting relates to the signal equalizer.

10. The method of claim 8, wherein a byte indicating a level relates to a remote setting of a background noise suppression level.

11. The method of claim 8, wherein a byte indicating a level relates to a remote setting of an acoustic echo cancellation level.

12. The method of claim 8, wherein a byte providing sensor data provides longitude data.

13. The method of claim 7, wherein the requested action is remote deactivation of background noise suppression.

14. The method of claim 7, further comprising:
   determining whether settings on the first smart device permit execution of the requested action; and
   either executing the requested action on the first smart device if the requested action is allowed or sending a decline message to the second smart device if the requested action is not allowed.

15. The method of claim 2, wherein the first metadata object is received by the first smart device over a separate Internet Protocol data connection.

* * * * *